United States Patent [19]
Ono

[11] Patent Number: 5,861,980
[45] Date of Patent: Jan. 19, 1999

[54] OPTICAL SPECTRUM ANALYZER AND METHOD FOR CONTROLLING OUTPUT OF OPTICAL AMPLIFIER

[75] Inventor: Takashi Ono, Tokyo, Japan

[73] Assignee: NEC Corporation, Tokyo, Japan

[21] Appl. No.: 709,217

[22] Filed: Sep. 6, 1996

[30] Foreign Application Priority Data

Sep. 8, 1995 [JP] Japan ................................ 7-231041

[51] Int. Cl.$^6$ .............................. H01S 3/00; G01N 21/00
[52] U.S. Cl. ............................ 359/341; 359/134; 356/72
[58] Field of Search .............................. 356/72, 73, 354; 359/134, 333, 341, 566

[56] References Cited

U.S. PATENT DOCUMENTS

| | | | |
|---|---|---|---|
| 5,268,786 | 12/1993 | Matsushita et al. | 359/341 |
| 5,463,487 | 10/1995 | Epworth | 359/124 |
| 5,532,864 | 7/1996 | Alexander et al. | 359/177 |
| 5,557,442 | 9/1996 | Huber | 359/179 |
| 5,570,221 | 10/1996 | Fujita | 359/161 |
| 5,636,054 | 6/1997 | Artigaud et al. | 359/341 |

FOREIGN PATENT DOCUMENTS 6-21897  1/1994  Japan .

OTHER PUBLICATIONS

H. Toba, et al., "16–channel Optical FDM Distribution/Transmission Experiment Utilizing ER$^{3+}$–Doped Fibre Amplifier", Electronics Letters, Jul. 6, 1989, vol. 25, No. 14.

Y. Nakabayashi, et al., "Er:Doped Fiber Amplifier for WDM Transmission Using Fiber Gain Control", Technical Report of IEICE, OCS94–66, OPE94–89 (1994–Nov.).

*Primary Examiner*—Mark Hellner
*Attorney, Agent, or Firm*—Sughrue, Mion, Zinn, Macpeak & Seas, PLLC

[57] ABSTRACT

Disclosed is an optical spectrum analyzer which has: a pulse oscillator for generating a pulse; an optical switch for switching a signal light in response to the pulse; an optical circulator which has at least three input-output ports and in which the output of the optical switch is connected to a first port of the optical circulator; a plurality of fiber gratings which are in series connected to a second port of the optical circulator to which a signal light entered into the first port is output, the fiber gratings having different Bragg wavelengths, respectively; and an optical detector which is connected to a third port of the optical circulator to which a reflected light from the fiber gratings is output.

6 Claims, 9 Drawing Sheets

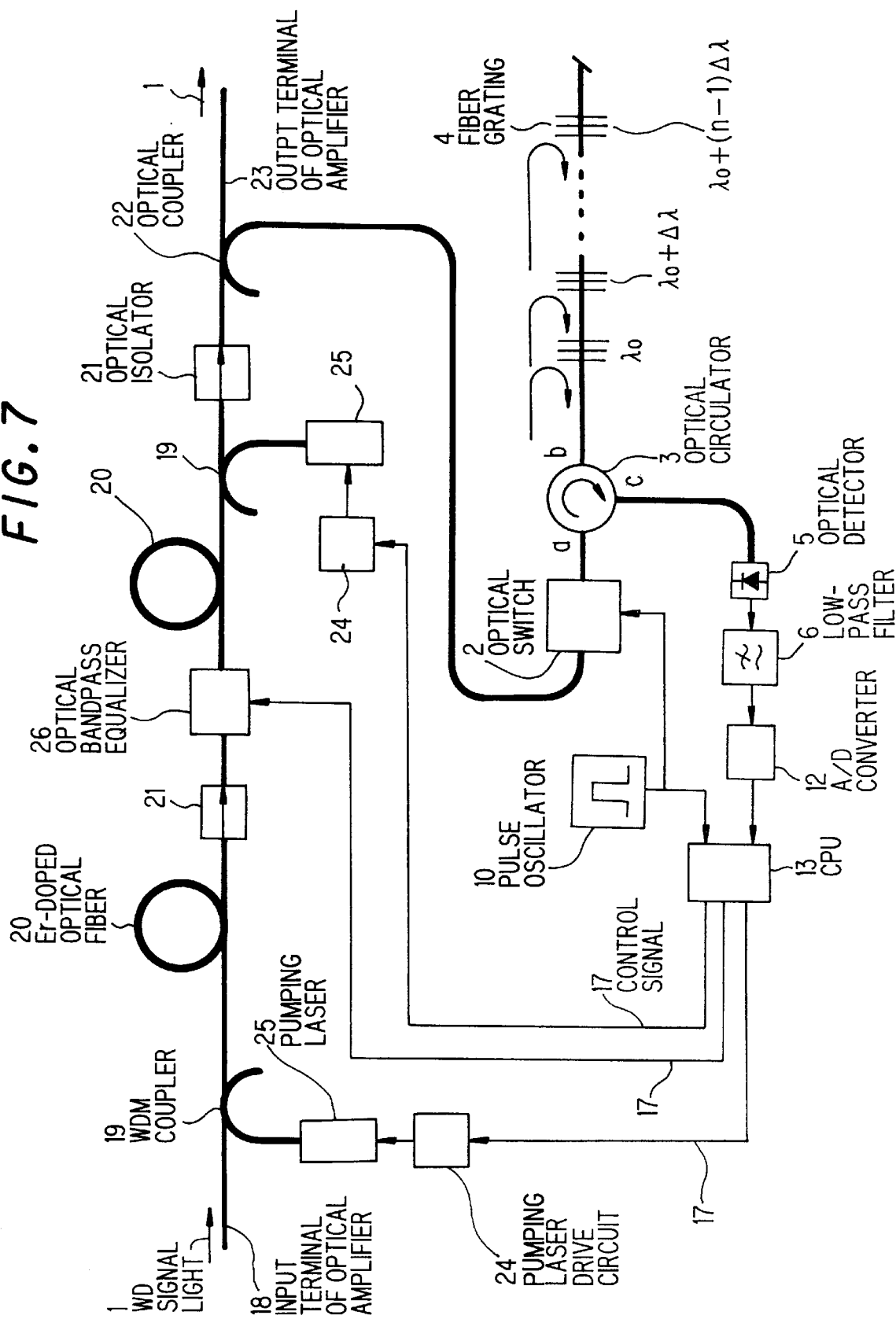

OUTPUT DATA OF A/D CONVERTER 12

OUTPUT DATA OF A/D CONVERTER 12

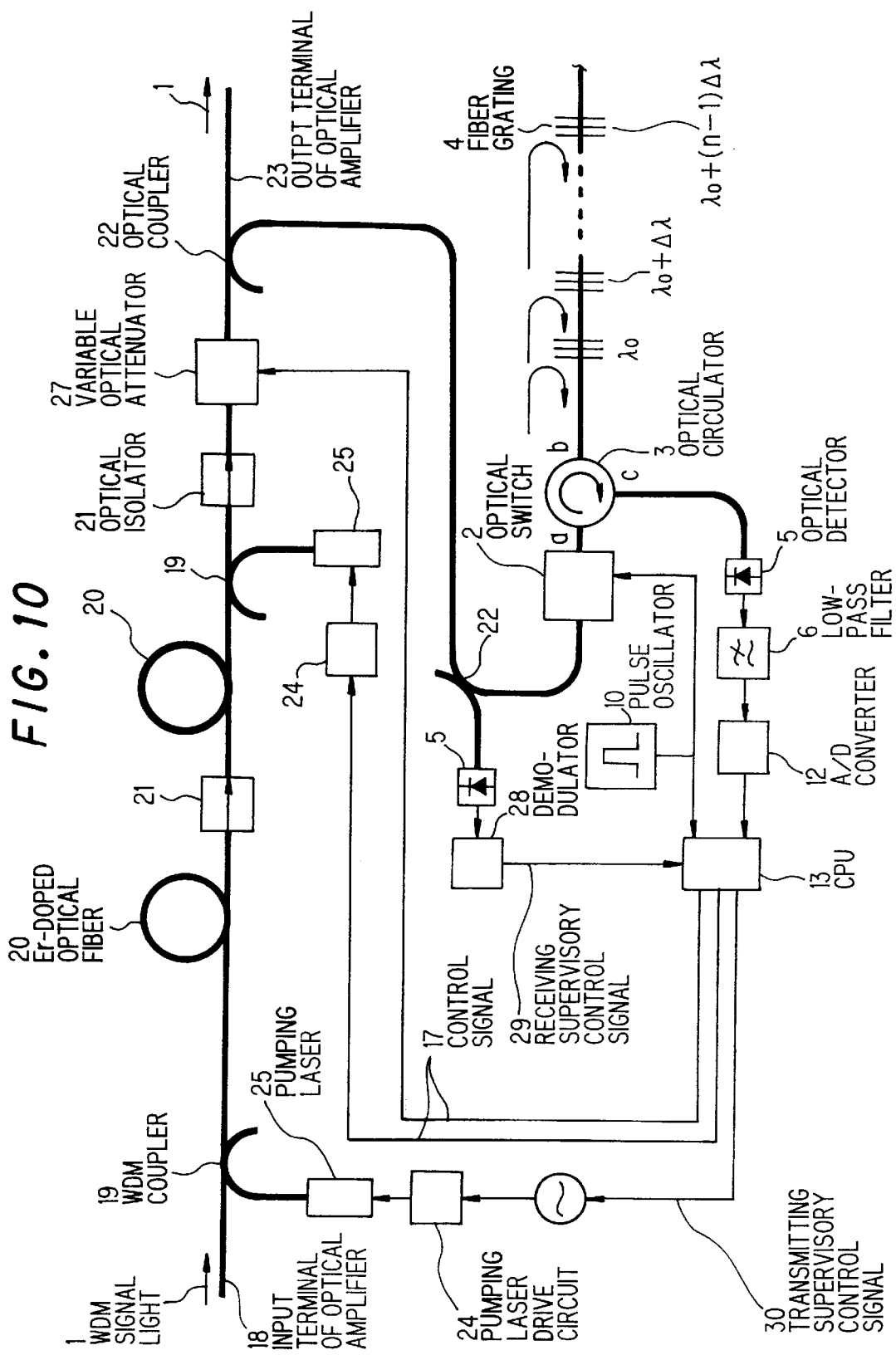

OPTICAL SPECTRUM ANALYZER AND METHOD FOR CONTROLLING OUTPUT OF OPTICAL AMPLIFIER

FIELD OF THE INVENTION

This invention relates to an optical spectrum analyzer and more particularly to, an optical spectrum analyzer for detecting a number of channels and power of each channel in a wavelength division multiplexing (hereinafter referred to as 'WDM') optical transmission system, and relates to a method for controlling the output of an optical amplifier by using the optical spectrum analyzer.

BACKGROUND OF THE INVENTION

Recently, along with the development of high-performance optical amplifiers, an optical amplification repeater transmission system in which a signal light is transmitted a long distance by being amplified has been researched. To realize a further big capacity, a WDM transmission system in which signal light multiplexed of many wavelengths is transmitted through one optical fiber is advantageous. In the optical amplifiers, where the WDM signal light can be wholly amplified, the upgrading such as the increase in number of channels is very easy by using many laser diodes having different wavelength, thereby realizing a low cost.

However, to simply increase the number of channels may cause the shifting of designed levels in the whole system, therefore requiring the readjusting of output power or amplitude ratio of the optical amplifier. This is similarly caused in the case that the number of channels is reduced due to any trouble. To automatically conduct the readjustment, the current number of channels used needs to be supervised.

It is known to analyze the number of channels and optical spectrum in WDM signal light by using a scanning Fabry-Perot interferometer (refer to H.Toba, et al.,"16-channel Optical FDM Distribution/Transmission Experiment utilizing $Er^{3+}$-doped Fiber Amplifier", Electronics Letters, vol.25, No.14, pp.885–887(1989)) In this interferometer, two mirrors are located being opposed in parallel to transmit only a light with a frequency (wavelength) an integer times of the longitudinal mode of a resonator. Varying the position of one mirror by a piezo-element, the interval of the interferometer is repeatedly scanned to analyze an optical spectrum.

Furthermore, it is known to detect the power of a backward amplified spontaneous emission light and thereby control the output of a pumping laser to be constant to make the gain constant regardless of the variation in the number of channels (refer to Y.Nakabayashi, et al., "Er: Doped Fiber Amplifier for WDM Transmission Using Fiber Gain Control", Technical Report of IEICE, OCS94-66, OPE94-89(1994)).

However, in the conventional method, the reliability for long time operation may be reduced since they include mechanical moving elements due to the construction of the interferometer. Further, to scan around 30 nm corresponding to the band of erbium-doped optical fiber amplifier (EDFA), the resonator length of the interferometer needs to be less than 40 $\mu$m, therefore making the fabrication difficult.

On the other hand, in the conventional method for controlling output of an optical amplifier, while the gain can be controlled, the number of channels and the shifting of wavelength cannot be supervised.

SUMMARY OF THE INVENTION

Accordingly, it is an object of the invention to provide an optical spectrum analyzer which does not include a mechanical moving element and realizes a small size and a stable operation.

It is a further object of the invention to provide a method for controlling the output power and wavelength property of an optical amplifier using the optical spectrum analyzer.

According to the invention, an optical spectrum analyzer, comprises:

a pulse oscillator for generating a pulse;

an optical switch for switching a signal light in response to the pulse;

an optical circulator which has at least three input-output ports and in which the output of the optical switch is connected to a first port of the optical circulator;

a plurality of fiber gratings which are in series connected to a second port of the optical circulator to which a signal light entered into the first port is output, the fiber gratings having different Bragg wavelengths, respectively; and an optical detector which is connected to a third port of the optical circulator to which a reflected light from the fiber gratings is output.

According to another aspect of the invention, an optical spectrum analyzer, comprises:

a pulse oscillator for generating a pulse;

an optical switch for switching a signal light in response to the pulse, the optical switch having at least two input ports and one output port;

a plurality of fiber gratings which are in series connected to the output port to which a signal light entered into a first port of the optical switch is output when the optical switch turns ON, the fiber gratings having different Bragg wavelengths, respectively; and an optical detector which is connected to a second input port of the optical switch to which a reflected light from fiber gratings is output when said optical switch turns OFF.

Also, according to another aspect of the invention, a method for controlling the amplitude ratio, output power and optical band property of an optical amplifier used in a wavelength division multiplexing system, comprises the steps of:

detecting the number of channels of signal lights output from the optical amplifier by an optical spectrum analyzer; and controlling the output power of a pumping laser such that it falls under a predetermined power value in response to the number of wavelengths.

Also, according to another aspect of the invention, a method for controlling the gain, output power and optical band property of an optical amplifier used in a wavelength division multiplexing system, comprising the steps of:

detecting the power of a signal light to each channel output from the optical amplifier by an optical spectrum analyzer;

calculating an average and dispersion of power values of signal lights of the each channel; and controlling the wavelength property of an optical equalizer connected to an output end of the optical amplifier such that the value of the dispersion is minimized.

Also, according to another aspect of the invention, a method for controlling the gain, output power and optical band property of an optical amplifier used in a wavelength division multiplexing system, comprising the steps of:

detecting the power of a signal light to each channel output from the optical amplifier by an optical spectrum analyzer;

fitting data of wavelength and power of the signal light to a linear function using the method of least squares; and controlling the output power of a pumping laser such that an inclination value in the linear function obtained by the fitting is zero.

The invention utilizes the character that fiber gratings reflect a light with a wavelength coinciding with a Bragg wavelength and transmit a light with another wavelength. When a plurality of fiber gratings with different wavelengths are in series located at certain intervals and pulsating WDM signal lights are entered into there, propagation time difference occurs because of the difference in reflection point depending on the wavelength. As a result, the WDM signal lights reflected from the fiber gratings forms optical pulses aligned in the direction of time axis. By counting the number of the pulses, the number of channels can be determined. Furthermore, when the Bragg wavelength fiber gratings shifted by a certain rate is located at certain intervals and the intensities of the reflected optical pulses are precisely measured, the optical spectrum can be analyzed.

Furthermore, using the information regarding the number of channels, the controlling the gain or the output power of each channel to be constant regardless of the number of channels is performed by that when the number of channels is increased the pumping power is increased, and when the number of channels is decreased the pumping power is reduced.

Other than the number of channels, the output power to each channel can be detected to calculate the average and the dispersion from the average of the output power. By controlling the optical equalizer connected to the output end of the optical amplifier to minimize the dispersion value, the wavelength property of amplitude ratio can be flattened.

The data of output power of each channel is fitted to a linear function to calculate the inclination, i.e., the slope of wavelength property of gain. The slope of wavelength property of gain can be controlled by changing the saturation depth of the optical amplifier by adjusting the pumping power. Namely, when the pumping power is controlled to always make the calculated inclination value zero, the wavelength property of gain can be flattened.

BRIEF DESCRIPTION OF THE DRAWINGS

The invention will be explained in more detail in conjunction with the appended drawings, wherein:

FIG. 7 is a block diagram for explaining a method for controlling output power of an optical amplifier in a fifth preferred embodiment according to the invention, FIG. 10 is a block diagram for explaining a method for controlling output power of an optical amplifier in a sixth preferred embodiment according to the invention.

DESCRIPTION OF THE PREFERRED EMBODIMENTS

Figure 1:
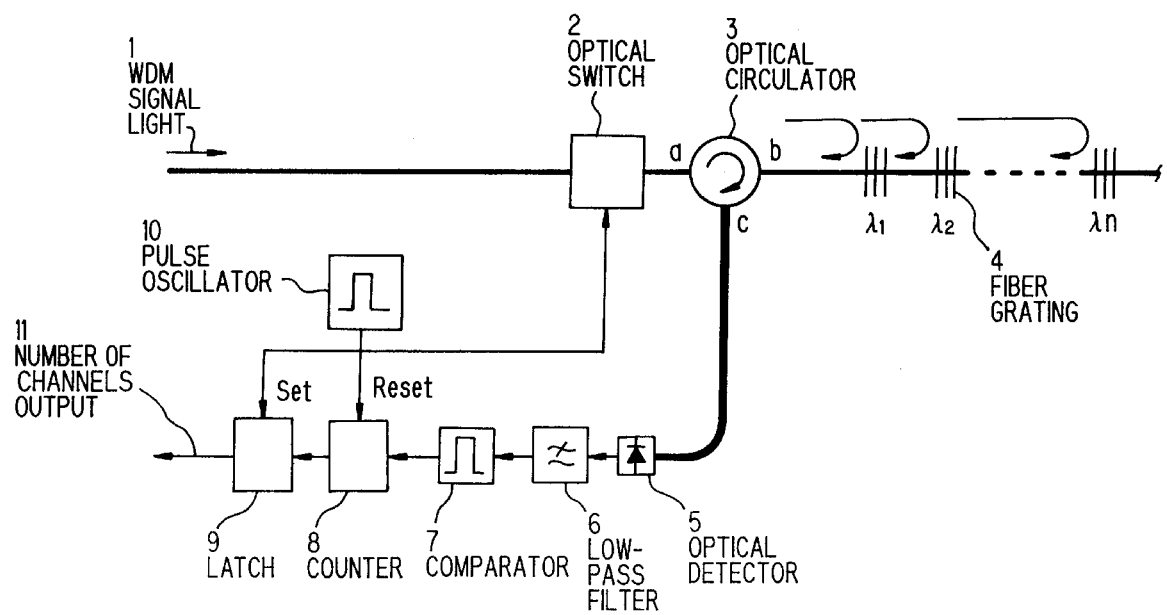
FIG. 1 is a block diagram showing an optical spectrum analyzer in a first preferred embodiment according to the invention.

An optical spectrum analyzer in the first preferred embodiment according to the invention will be explained in FIG. 1.

The first embodiment is an example that the invention is applied to eight-channel WDM and an optical intensity modulation-direct detection reception (IM-DD) type channel-number supervision equipment. WDM signal light 1 obtained by multiplexing lights with eight wavelengths at intervals of 2 nm from 1546 to 1560 nm which are modulated by 10 Gb/s, is input to an optical switch 2 using acoustooptic effect(AO). Inputting the output of a pulse oscillator 10 which oscillates with a pulse width of 5 ns and a pulse-repetition rate of 200 ns into the optical switch 2, the WDM signal light 1 is switched into pulsating WDM signal light having a pulse width of 5 ns. The pulsating WDM signal light is input to port a of an optical circulator 3. The optical circulator 3 has three input-output ports a, b and c, where light input to the port a is output to the port b and light input to the port b is output to the port c. To the port b of the optical circulator 3 a plurality of fiber gratings 4 are connected in series, where the pulsating WDM signal light is input. The fiber gratings 4 are formed by writing a periodical refractive index variation by ultraviolet laser in an optical fiber. They have optical filter properties that a light with a wavelength which is equal to a Bragg wavelength determined by the interval of the refractive index variation is reflected and the other lights are transmitted therethrough. In the first embodiment, the fiber gratings composed of eight portions which have different Bragg wavelengths at intervals of 2 nm from 1546 equal to the wavelength of signal light to 1560 nm are written in one optical fiber. The positions where the fiber gratings are written are at intervals of 2 m. The reflecting light band width is around 0.5 nm. The end of the last one of the fiber gratings connected in series is obliquely polished to optically terminate not to return unnecessary reflected light. As a result, for example, a signal light of 1546 nm wavelength is first reflected and a signal light of 1548 nm wavelength is then reflected after forwarding 2 m through the optical fiber, then each of them is output from the port c of the optical circulator 3.

Figure 2:
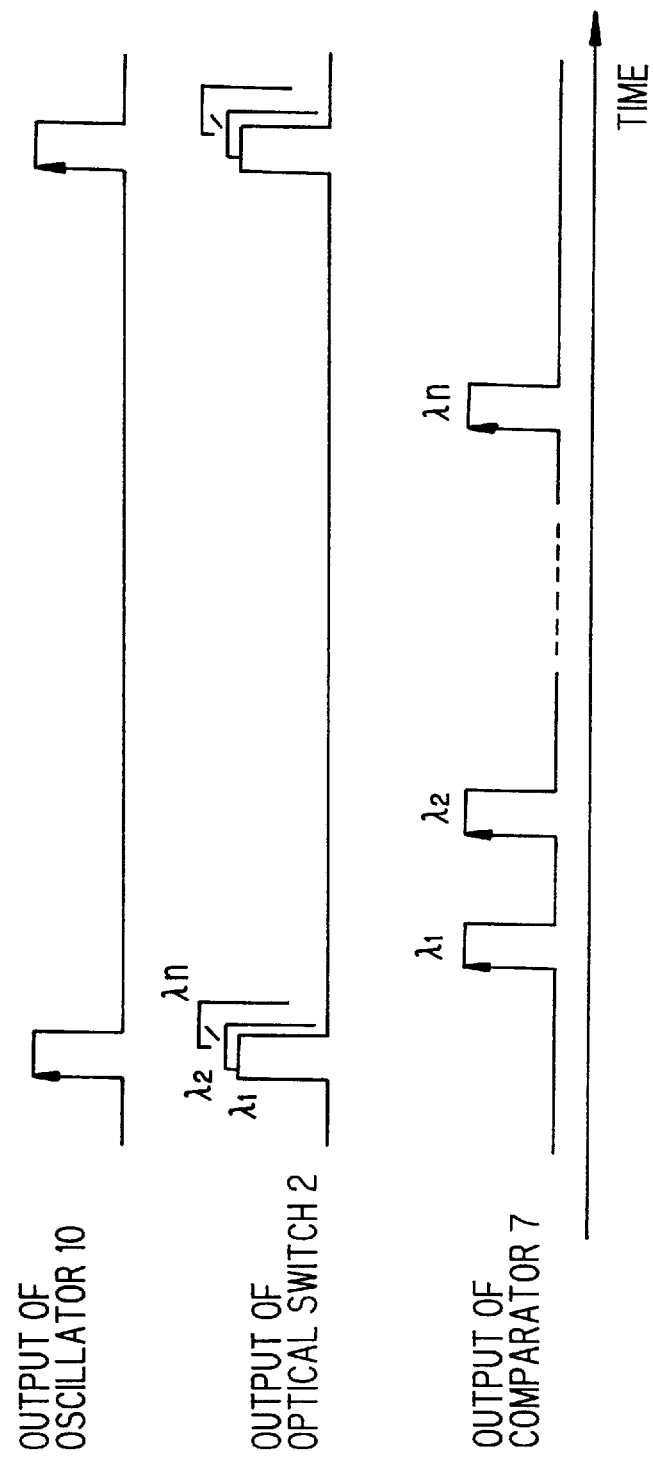
FIG. 2 shows optical pulses output from some parts of the optical spectrum analyzer in FIG. 1.

As shown in FIG. 2, which illustrates the operating principle, between two signals with wavelengths different from each other by 2 nm, a delay time difference of 20 ns occurs, and the pulsating WDM signal light is turned into a row of optical pulses which are aligned in the order of wavelength in the direction of time axis. The optical pulse row is then converted into an electric signal by an optical detector 5, further removing the component of 10 Gb/s by a low-pass filter 6 to obtain a row of electric pulses. The electric pulses are formed into rectangular pulses at a comparator 7 and are then input to a counter 8. The counter 8 counts a number of pulses only when the output pulse of the pulse oscillator 10 is on 'Low' level and is reset when reaching 'High' level. The output of the counter 8 is latched by a latch 9 through 'High' level of output pulses from the pulse oscillator 10 to output the number of pulses. Since the number of pulses coincides with the number of channels, the number of channels used in the WDM system can be supervised.

As a result, the optical spectrum analyzer in the first embodiment operates stably to output 8, the number of channels from the latch 9. Similarly, when the number of channels multiplexed is changed, the corresponding number of channels is correctly output from the latch 9. Thus, the effectiveness of the invention is confirmed.

Though in the first embodiment the number of fiber gratings is equal to the predetermined number of the wavelengths in the signal light, it is not limited thereto. Expecting to upgrade in the future, fiber gratings for unused wavelength band may be written in advance. The interval between wavelengths may be varied. If only the number of channels is to be supervised, the position where the fiber gratings are written may be set not so precisely.

Figure 3:
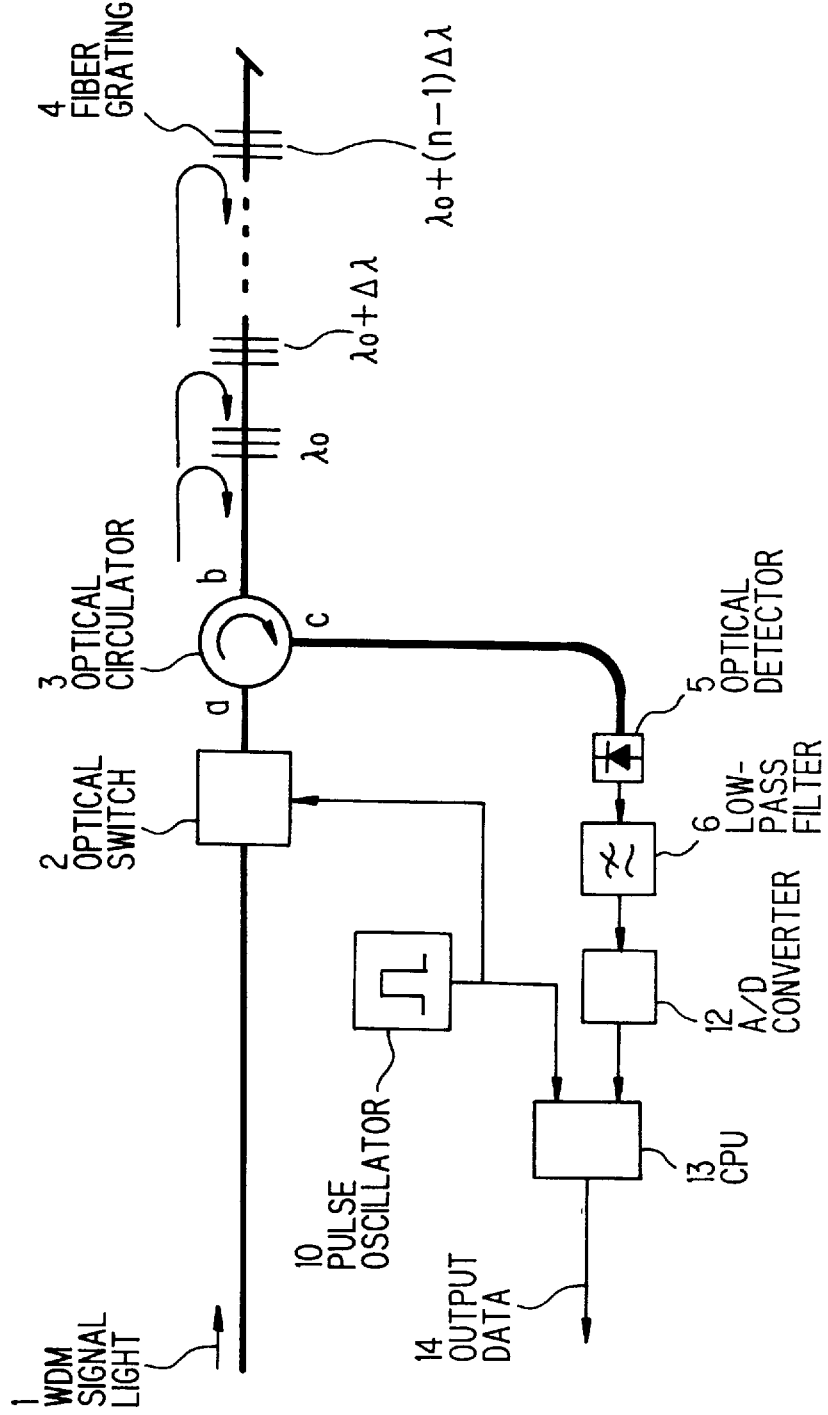
FIG. 3 is a block diagram showing an optical spectrum analyzer in a second preferred embodiment according to the invention.

An optical spectrum analyzer in the second preferred embodiment according to the invention will be explained in FIG. 3.

The second embodiment is an example that the invention is applied to an optical spectrum analyzer for analyzing optical spectra in a 10 Gb/s and eight-channel WDM system.

Figure 4:
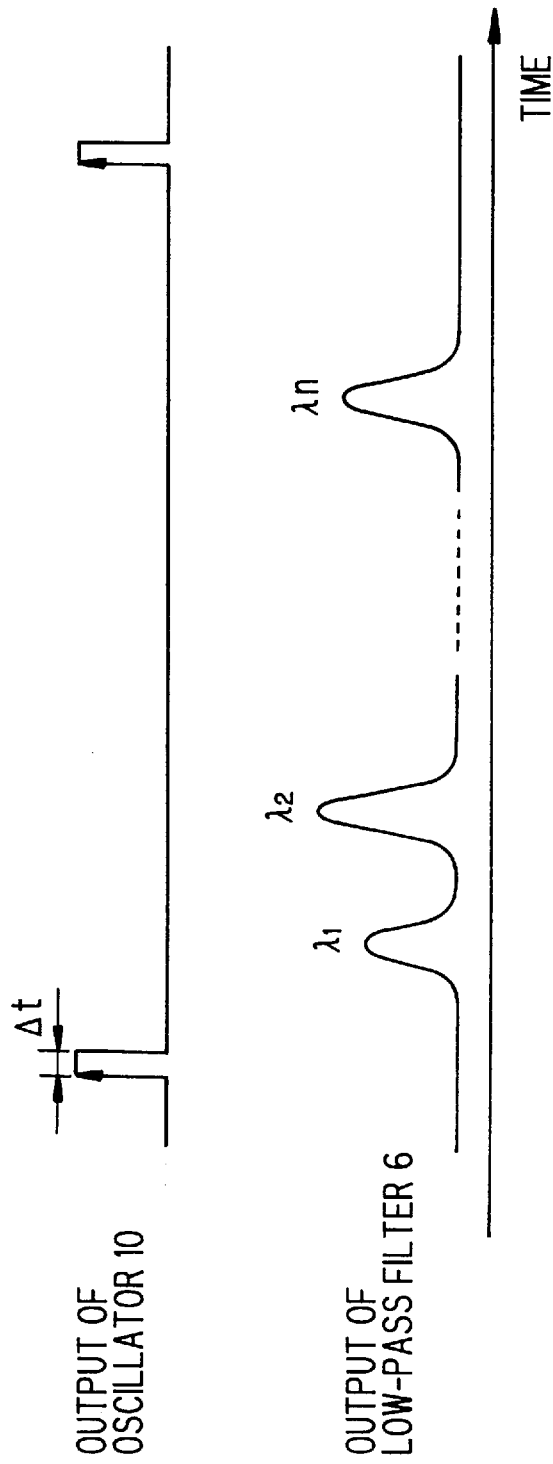
FIG. 4 shows optical pulses output from some parts of the optical spectrum analyzer in FIG. 3.

In the second embodiment, a plurality of fiber gratings are used which have the same reflection band and have Bragg wavelengths each of which is shifted at a constant rate. The reflection band is 0.5 nm, the Bragg wavelengths are at intervals of 0.5 nm from 1530 to 1565 nm, and the fiber gratings are written at intervals of 50 cm in one optical fiber. The pulse width of the pulse oscillator 10 is set to be 5 ns equal to the propagation time difference when reciprocating 50 cm. As a result, all over the wavelength range from 1530 to 1565 nm the analysis can be conducted with a resolution bandwidth of 0.5 nm. Furthermore, by determining the intensity of the optical pulse row reflected from the fiber grating, the wavelength of each signal light and power of each channel other than the number of channels can be analyzed (refer to FIG. 4 for explaining the operating principle). Thus, the intensities of output pulses from the low-pass filter 6 are determined while periodically sampling, and converted into digital signals by an A/D converter 12. The digital signal data is input to CPU 13 where data during one output period of the pulse oscillator 10 are processed as one set. Namely, a row of time axes corresponds to a wavelength axis, and a row of data, to which the output pulses of the pulse oscillator 10 are used as a time reference, can be regarded as an optical spectrum.

As a result, in operation of the optical spectrum analyzer in the second embodiment, an optical spectrum for eight-channel WDM signal light was obtained. In these data, the number of peaks, peak time (the order of data) and peak values can indicate the number of channels, wavelength and power, respectively. Thus, the effectiveness of the invention was confirmed.

Figure 5:
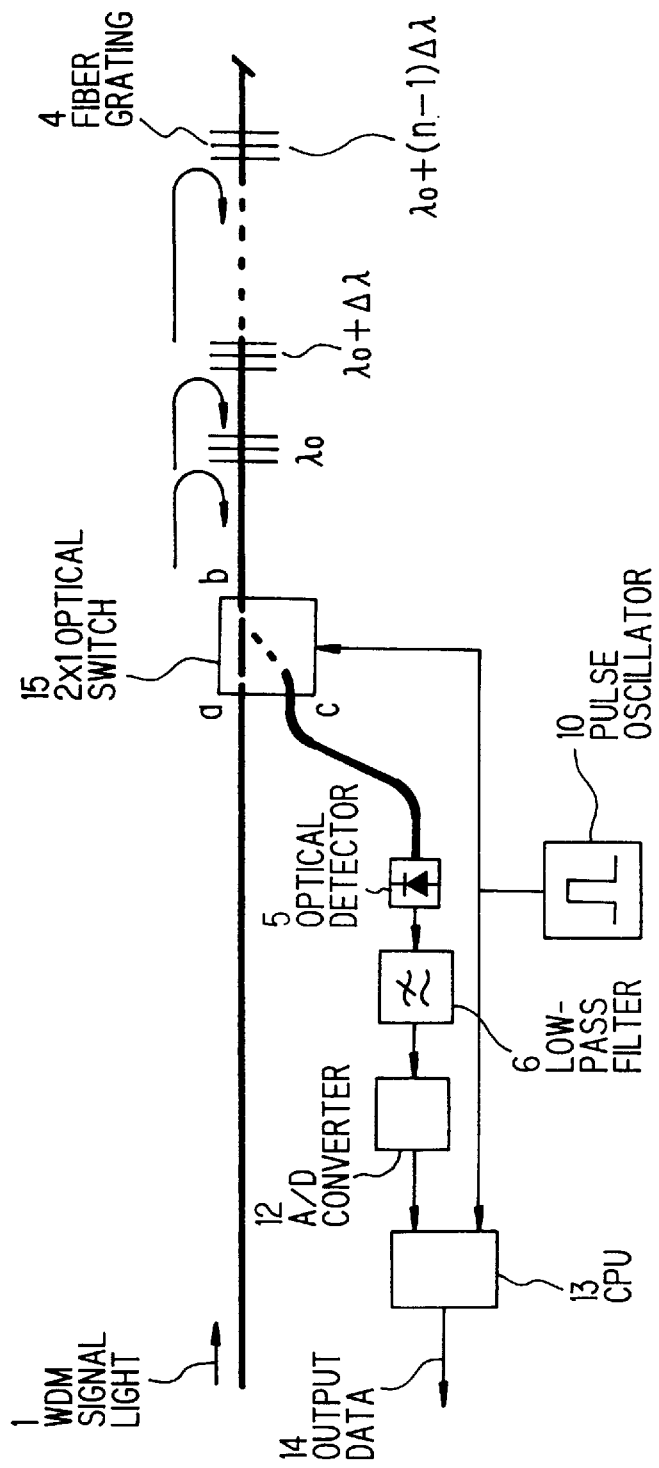
FIG. 5 is a block diagram showing an optical spectrum analyzer in a third preferred embodiment according to the invention.

An optical spectrum analyzer in the third preferred embodiment according to the invention will be explained in FIG. 5.

The third embodiment is an example that an optical switch with two inputs and one output (2×1) where operations of an optical switch and an optical circulator are integrated is used. The composition and operation therein are similar to those in the second embodiment. The 2×1 optical switch 15 is composed of two optical waveguides which are closely formed on a lithium niobate substrate, where signal light can be switched when electric field is applied to the optical coupling portion between the optical waveguides. In the 2×1 optical switch 15, the ports a and b are switched 'ON' when the output of the pulse oscillator 10 is 'High' and the ports c and b are switched 'ON' when the output o the pulse oscillator 10 is 'Low'. Namely, only when the output of the pulse oscillator 10 is 'High', the WDM signal light 1 is passed, and when the output of the pulse oscillator 10 is 'Low', the WDM signal light 1 is not passed. On the other hand, when the output of the pulse oscillator 10 is 'Low', reflected light from the fiber gratings 4 is output to the port c. As a result, pulsation of the WDM signal light 1 and separation of reflected lights can be simultaneously performed by one element.

In operation of the optical spectrum analyzer in the third embodiment, a stable operation was obtained similarly to the second embodiment and an optical spectrum for eight-channel WDM signal light was obtained. Thus, the effectiveness of the invention was confirmed.

Figure 6:
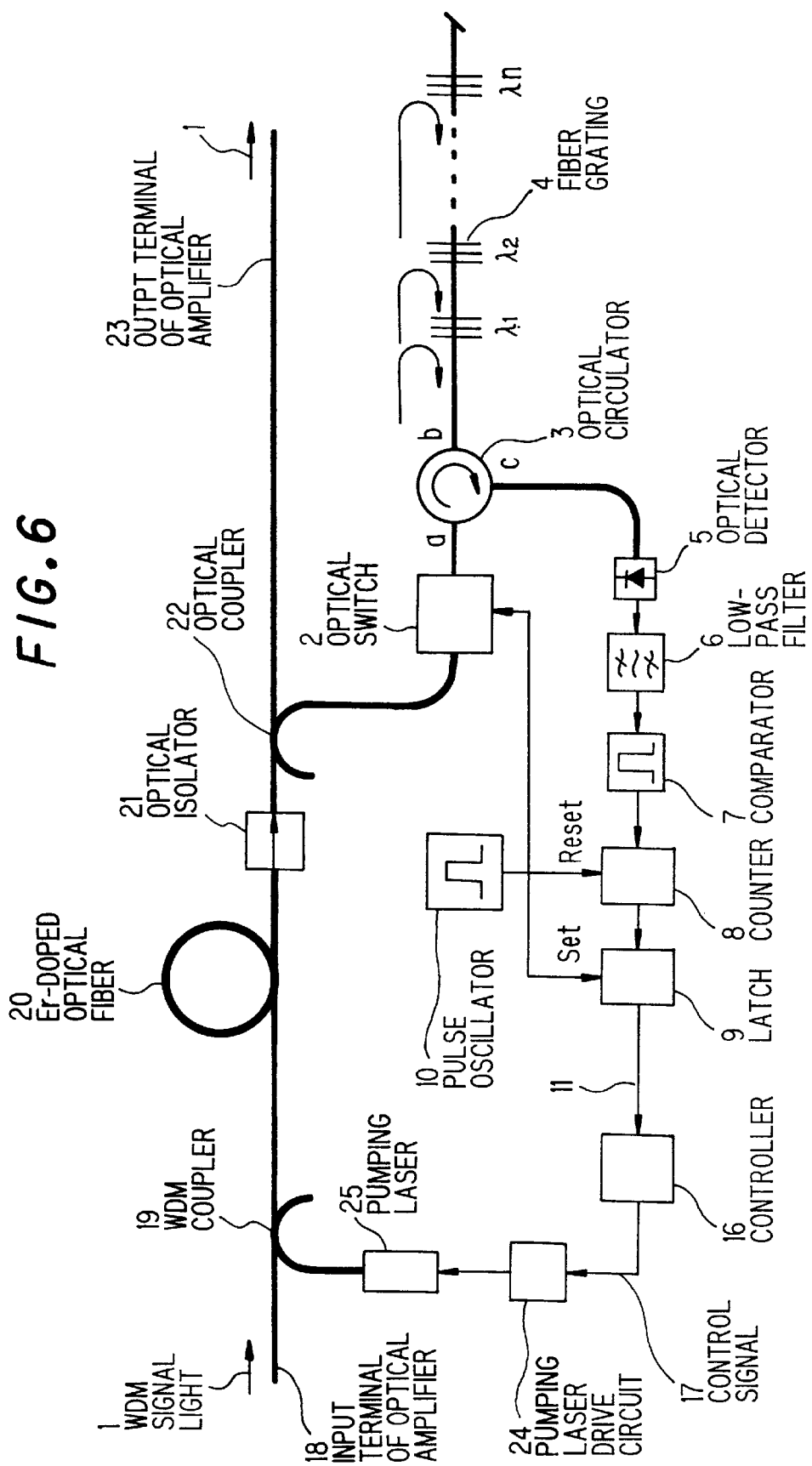
FIG. 6 is a block diagram for explaining a method for controlling output power of an optical amplifier in a fourth preferred embodiment according to the invention.

The fourth preferred embodiment according to the invention will be explained in FIG. 6. The fourth embodiment is an example that the optical spectrum analyzer explained in the first embodiment is applied to a method for controlling the power of an optical amplifier. The method for detecting the number of channels is similar to that in the first embodiment. The WDM signal light 1 input to an input terminal 18 of the optical amplifier and pumping light output from a pumping laser 25 are coupled by a WDM coupler 19 and are input to an Er(erbium)-doped optical fiber 20. The WDM signal light 1 amplified by the Er-doped optical fiber 20 is passed through an optical isolator 21 and is then divided into two lights by an optical coupler 22. One light is taken as an output from an output terminal 23 of the optical amplifier. Another light is input to an optical spectrum analyzer section. The optical spectrum analyzer section is similar to that in the first embodiment, where a number of channels is detected and is output from the latch 9. A controller 16 outputs a voltage proportional to the channel-number output 11. The voltage is input to a pumping laser drive circuit 24 as a control signal 17. The pumping laser drive circuit 24, depending on the input control signal 17, operates to increase the driving current for the pumping laser when the number of channels is increased and to decrease the driving current for the pumping laser when the number of channels is decreased. As a result, the gain and output power of each channel can be kept to be constant regardless of the number of channels.

In performing the method for controlling the power of the optical amplifier in the fourth embodiment, a stable operation was obtained and the gain was controlled to make the output of each wavelength constant even when the number of channels was changed. Thus, the effectiveness of the invention was confirmed.

Figure 8A:
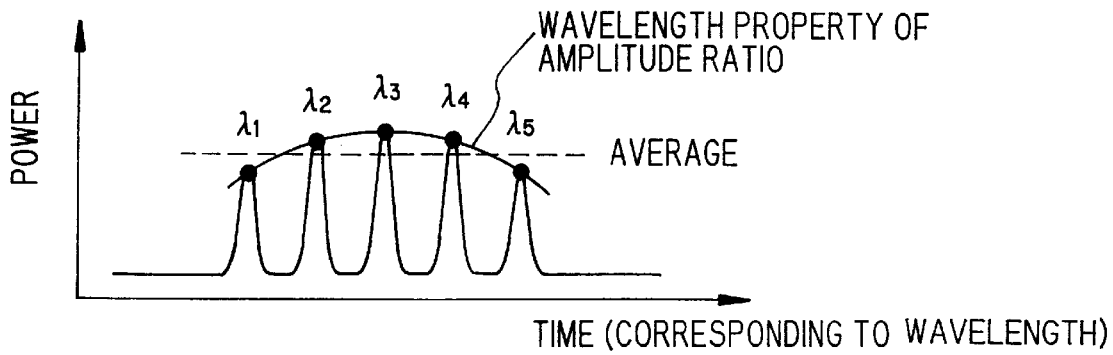
FIGS. 8A and 8B shows a wavelength property of an optical amplifier and a transmission wavelength property of an optical band equalizer.
Figure 8B:
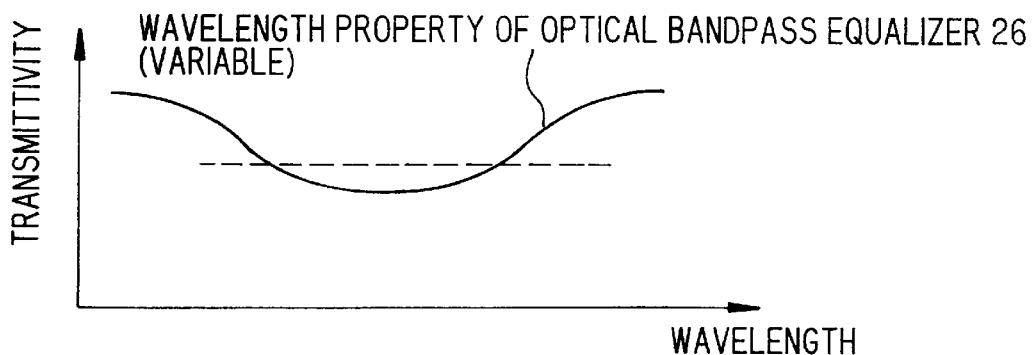

The fifth preferred embodiment according to the invention will be explained in FIG. 7. The fifth embodiment is an example that the optical spectrum analyzer explained in the second embodiment is applied to a method for controlling the flattening in wavelength properties of an optical amplifier. As shown in FIG. 7, employed is a two-stage optical amplifier in which an optical band equalizer 26 is disposed between a forward pumping optical amplifier and a backward pumping optical amplifier. The optical band equalizer 26 is a Mach-Zehnder interferometer type optical filter fabricated with waveguides, which has periodical transmission properties to wavelength. By adjusting the branching ratio and phase into two ports of the Mach-Zehnder interferometer, the central wavelength and extinction ratio in transmission wavelength properties of the optical filter can desirably be controlled. Branching a part of the output of the two-stage optical amplifier, power (or peak value) of each channel is detected by the optical spectrum analyzer explained in the second embodiment (refer to FIG. 8). FIG.

8 shows an example of wavelength properties of the optical amplifier and a transmission wavelength property of the optical band equalizer 26.

Power data of wavelengths converted into digital signals at an A/D converter 12 are subject to calculation by CPU 13 to give an average and dispersion. The average corresponds to an output power per one channel of optical amplifier. By controlling the output power of the pumping laser 25 such that the average coincides with a predetermined value, amplitude ratio can be kept constant regardless of the number of channels. Here, while the total output power is varied depending on the number of channels, output power (or amplitude ratio) per one channel is kept constant.

Figure 9:
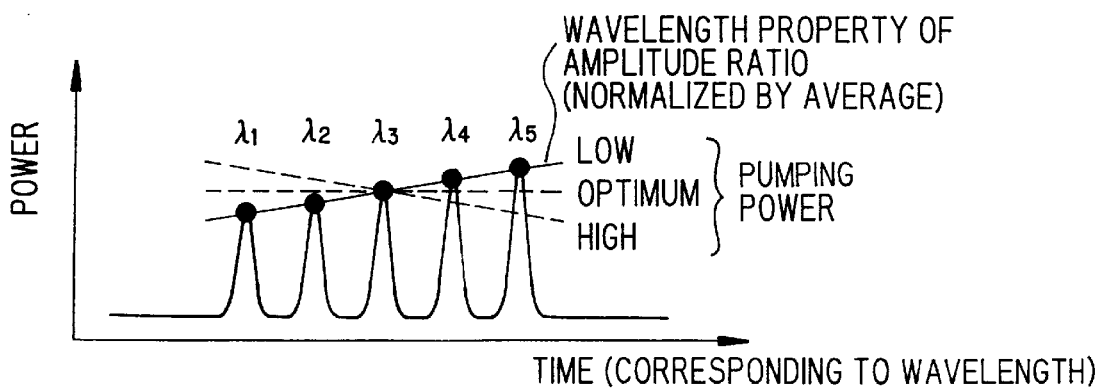
FIG. 9 shows a wavelength property of an optical amplifier and a wavelength property when exciting power is varied.

Meanwhile, the calculated dispersion represents the amount of peak power dispersing from the average and is equal to the level of wavelength dependency in gain. The wavelength properties of an optical amplifier in a wavelength band generally used include a linear function property expressed as going up or down to the right or a quadric function property expressed as being convex upward or downward (refer to FIGS. 8 and 9). FIG. 9 shows, as an example of wavelength properties of an optical amplifier, variations in wavelength property when the pumping power is changed. These wavelength properties can be equalized using the transmission wavelength property of a Mach-Zehnder interferometer type optical filter to flatten the wavelength property of the optical amplifier. In this embodiment, by controlling the optical band equalizer 26 to always minimize the dispersion value, a stable flattening control can be achieved. In addition, even when the wavelength property of an optical amplifier includes more than two peaks, the flattening can be achieved using an optical band equalizer with multistage Mach-Zehnder interferometers.

In performing the method for controlling the power of the optical amplifier in the fifth embodiment, a stable operation was obtained and the gain was controlled to make the output of each wavelength constant even when the number of channels was changed. Also, the wavelength property was controlled to be flat. Thus, the effectiveness of the invention was confirmed.

The sixth preferred embodiment according to the invention will be explained in FIG. 10. The sixth embodiment is an example that the invention is, as similar to the fifth embodiment, applied to a method for controlling the flattening in wavelength properties of an optical amplifier. Furthermore, in the sixth embodiment, a function of transferring supervisory information is added.

If it is previously known that the wavelength property of an optical amplifier can be approximated to a liner function, the wavelength property can be flattened by controlling the output power of the pumping laser 25 without requiring the optical band equalizer Z6. This is because an erbium-doped optical fiber amplifier has a property as below. Namely, when the pumping power input to the optical amplifier is decreased, the wavelength property going up to the right that amplitude ratio is increased on the side of longer wavelength is obtained, and when the exciting power input to the optical amplifier is increased, wavelength property going down to the right that gain is decreased on the side of longer wavelength is obtained. Thus, the data indicating the relationship between wavelength and power to be detected in the above operation are fitted into a linear function with using the method of least squares by CPU 13 to calculate the inclination. Then the output power of the exciting laser 25 can be controlled to make the inclination value zero, thereby flattening the wavelength property. However, while the inclination of wavelength property can be controlled by controlling the pumping power, the output power of the optical amplifier must be simultaneously varied. To solve this problem, depending on the number of channels, a variable optical attenuator 27 can be controlled such that the output power of the optical amplifier takes a predetermined value.

Meanwhile, in an optical amplifier repeater transmission system in which multistage repeater transmission is conducted with optical amplifiers, it is necessary to transfer supervisory information such as a number of channels, power of each channel and driving current of pumping laser and an alarm signal regarding each optical amplifier repeater. Thus, the supervisory information are transferred to a terminal office by modulating the WDM signal light with a subcarrier. Driving VCO (voltage-controlled oscillator) 31 by a supervisory control signal 30 to be transmitted, the subcarrier output from VCO 31 is FSK (frequency shift keying)-modulated. Then, by modulating the driving current of the pumping laser by this signal, the pumping power is modulated. As a result, the intensity of the WDM signal light 1 is modulated with the subcarrier. In the terminal receiving office, an arbitrary wave of the WDM signal light is picked up using an optical filter, inputting it into an optical detector and converting into an electric signal, thereafter demodulating the FSK signal. When the terminal office sends an instruction to a repeater, an arbitrary wave of signal light is similarly subcarrier-modulated and is transferred. Thus, the supervisory control signal 30 can be transferred to achieve the supervision on system operation and the remote control thereof.

In performing the method for controlling the power of the optical amplifier in the fifth embodiment, a stable operation was obtained and the gain was controlled to make the output of each wavelength constant even when the number of channels was changed. Also, the wavelength property was controlled to be flat. Moreover, reception and transfer of the supervisory information was achieved. Thus, the effectiveness of the invention was confirmed.

As explained above, the invention can provide an optical spectrum analyzer which does not include a mechanical moving element and realizes a small size and a stable operation. Also, the invention can provide a method for controlling the output power and wavelength property of optical amplifier using the optical spectrum analyzer.

Herein, though the above embodiments employ an acoustooptic effect (AO) optical switch as the optical switch 2, they may use any other optical switches or optical modulators such as a Mach-Zehnder type optical switch or optical modulator, semiconductor absorption type optical modulator.

The optical circulator may be replaced by an optical coupler and optical isolator or any other devices which can separate incident light and reflected light.

The fiber gratings with different Bragg wavelengths does not necessarily need to be in series located. If the order is known, they may be located in any order. When only the number of channels is to be searched, the order does not matter. Alternatively, chirped fiber gratings in which Bragg wavelengths are shifted in series may also be used.

The optical amplifier, though the above embodiments employ the erbium-doped optical fiber amplifier, may be replaced by any other types of optical amplifiers such as a semiconductor optical amplifier, an optical fiber amplifier doped another element, for example, rare earth elements such as praseodymium, ytterbium, neodymium, a Raman optical amplifier etc.

The optical band equalizer 26, though the above embodiments employ the Mach-Zehnder type optical filter, may be replaced by any other types of optical filters which can control wavelength property with an external signal, for example, a dielectric multilayer optical filter, acoustooptic effect (AO) optical filter, optical filter with gratings, etc.

Though the FSK subcarrier modulation is used to transmit the supervisory control signal 30, it may be replaced by any other modulation methods such as phase shift keying (PSK) if they does not cause a serious degradation to a main signal. Other than the subcarrier modulation, it is possible to transmit by wavelength multiplexing where providing a wavelength only for a supervisory signal and conducting a baseband modulation (including a standard intensity modulation).

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical spectrum analyzer, comprising:

a pulse oscillator for generating a pulse;

an optical switch for switching a signal light in response to said pulse;

an optical circulator which has at least three input-output ports and in which the output of said optical switch is connected to a first port of said optical circulator;

a plurality of fiber gratings which are in series connected to a second port of said optical circulator to which a signal light entered into said first port is output, said fiber gratings having different Bragg wavelengths, respectively; and an optical detector which is connected to a third port of said optical circulator to which a reflected light from said fiber gratings is output.

2. An optical spectrum analyzer, according to claim 1, further comprising:

a low-pass filter to which the output of said optical detector is input; and a counter which counts the number of output pulses from said low-pass filter over a period of said pulse oscillator.

3. An optical spectrum analyzer, according to claim 1, further comprising:

a low-pass filter to which the output of said optical detector is input;

an A/D converter which converts an analog signal output from said low-pass filter into a digital signal; and CPU which input the output from said A/D converter.

4. An optical spectrum analyzer, according to claim 1, wherein:

said fiber gratings having equal reflection bands and located at equal intervals, wherein a Bragg wavelength of the number n (n is a natural number) fiber grating is $\lambda 0+(n-1)\Delta\lambda$ wherein $\lambda 0$ is a wavelength shorter than a wavelength band including a WDM signal light to be used and $\Delta\lambda$ is a predetermined wavelength step.

5. An optical spectrum analyzer, comprising:

a pulse oscillator for generating a pulse;

an optical switch for switching a signal light in response to said pulse, said optical switch having at least two input ports and one output port;

a plurality of fiber gratings which are in series connected to output port to which a signal light entered into a first port of said optical switch is outout when said optical switch turns ON, said fiber gratings having different Bragg wavelengths, respectively; and an optical detector which is connected to a second input port of said optical switch to which a reflected light from fiber gratings is output when said optical switch turns OFF.

6. A method for controlling the gain, output power and optical band property of an optical amplifier used in a wavelength division multiplexing system, comprising the steps of:

detecting the number of channels of signal lights output from said optical amplifier by means for analyzing an optical spectrum; and controlling the output power of a pumping laser such that it falls under a predetermined power value in response to said number of wavelengths.

* * * * *